May 7, 1935.  H. D. STANLEY  2,000,199

METHOD OF SEALING BATTERY POSTS

Filed Feb. 26, 1931

Inventor
HAROLD D. STANLEY
Attorney
A. D. J. Libby

Patented May 7, 1935

2,000,199

UNITED STATES PATENT OFFICE 2,000,199

METHOD OF SEALING BATTERY POSTS

Harold D. Stanley, Bloomfield, N. J., assignor, by mesne assignments, to Thomas A. Edison, Incorporated, West Orange, N. J., a corporation of New Jersey Application February 26, 1931, Serial No. 518,327

1 Claim. (Cl. 136—176)

This invention relates to means for completing an acid-tight seal between the posts of a storage battery and a cover used for closing the top of the plate container.

In order to make electrical connection with the plates within the cell, the positive group of plates is provided with a bus- or tie-bar and likewise the negative group of plates is provided with its bus- or tie-bar, and from each of these tie-bars a post extends upwardly through the cover which is supported by rests or shoulders formed or moulded on the posts. A suitable acid-proof sealing compound fills the remaining space between the cover and the case.

My invention is directed to ways and means for obtaining acid-tight joints around the posts where they come through the cover.

Heretofore, various suggestions have been made for accomplishing the object, but I believe I am the first to propose the construction hereinafter described, the advantages of which will be readily understood after reading the specification together with the annexed drawing wherein.

Figure 1:
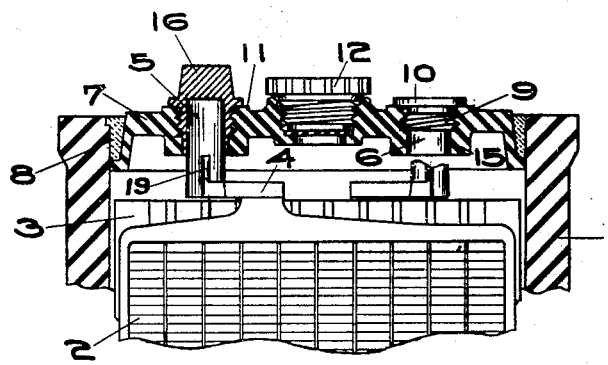
Figure 1 is a sectional view of the top part of a battery cell, showing one of the posts in completed arrangement, while the other post is broken away and a part of the sealing means therefor is shown in position in the cover.

In the drawing, wherein like numbers refer to corresponding parts in the various views, 1 is a container of any suitable insulating material for enclosing the battery plates 2, the plates of opposite polarity being separated by separators 3. In the description which follows, only one post will be described, but it is to be understood that this applies to both the positive and negative posts of the battery cells.

Across the top of the plates 2, is attached a bus- or tie-bar 4 and from the bar, a post 5 extends through a metallic bushing 6 which is screwed into cover 7 preferably of hard rubber. The cover 7 rests against the shoulders 19 on the posts 5 and is fastened in position at the top part of the container 1 by the use of some sealing compound 8 which may be applied in the usual way. It may be noted that the cover 7 is provided with a filler cap 12 for the purpose of adding water or acid to the battery, and the cap is usually provided with a vent hole to allow the gases to escape while the battery is being charged.

Figure 2:
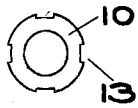
Figures 2 and 3 show different forms of the flanged portion of the sealing bushing.
Figure 3:
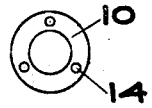
Figure 4:
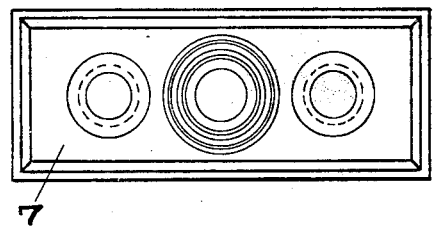
Figure 4 is a plan view of the cover of the cell as shown in Figure 1.

The bushing 6 is provided with threads 9 which engage cooperating threads in the cover 7. The top part of the bushing 6 is provided with a wide flange 10 which engages a seat on the cover 7. The flange 10 may be provided with notches 13 or with depressions 14, as shown in Figures 2 and 3, for the application of a suitable tool to screw the bushing 6 tightly within the threaded hole in the cover 7. Preferably, the cover 7 at the points where the bushings 6 are positioned, has reinforcing bosses or enlargements 15 in order to give a greater support for the bushings 6 which may extend through the bosses so as to engage the shoulders 19 on the posts 5. Preferably, the cover 7 is left in an undercured condition when it is moulded, thereby leaving the threads moulded in the bosses 15 in a more or less flexible state so that when the bushings 6 are screwed therein, the threads in the cover will conform to the threads on the metallic bushings.

Under the action of the acid, the cover becomes cured in a short time and the threads of the cover tightly grip the threads of the bushing, and this together with the wide flange 10, after the finishing operation to be now described, makes a complete seal around the battery post 5. After the bushings 6 have been inserted in the cover in the manner described, the cover is placed in position in the container 1 and the sealing compound 8 added and the finishing operation is performed around the top of the post 5 by autogenously joining the end of the post 5 with the flange 10 of the bushing 6, and while this operation is going on, metal 16 may be added as shown in Figure 1 for the completion of an end terminal post.

Figure 5:
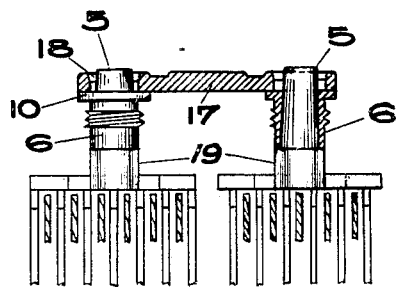
Figure 5 is a view showing an intermediate connector extending between two cells and ready for the finishing operation. At one of the cells is shown a part of the sealing means in elevation, while the like part at the other cell is shown in section.

As shown in Figure 5, an intermediate connector 17 is placed over two of the posts of different cells and against the flanges 10 of the respective bushings 6, leaving a space 18 around the top part of each post, whereby the ends of the posts 5, the connector 17, and the flanges 10, may be autogenously joined together, it being understood that the terminal posts 5, the bushings 6, and the connector 17 are of acid-resisting material such as lead.

Figure 6:
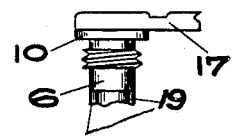
Figure 6 shows a finished battery post having an intermediate connector attached thereto.
Figure 7:
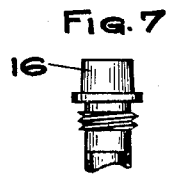
Figure 7 shows a finished battery post ready to receive an end connector.

After the joint between a cell post and the intermediate connector is finished, it has the general appearance indicated in Figure 6, whereas the finished terminal post for receiving an end connector is shown in Figure 7.

Some of the advantages derived by the construction above described, may be briefly stated as follows:

(1) The bushing 6 is made and handled as a separate piece and does not form an insert to be moulded in the cover, thereby saving the cost of freight or express on these bushings to the moulder of the cover, and simplifying and cheapening the cost of making the cover. In this connection, it may be remarked that the manufacturer of the storage battery cell does not usually make the container and cover, the construction of which requires different materials and a different class of machinery.

(2) It obviates the necessity of the cover manufacturer entering into the production of lead parts, an operation entirely foreign to his normal manufacturing.

(3) Should any of the covers become broken in shipment, no bushings are lost as they would be if they were moulded as an insert in the cover, and if any covers become broken in handling, the bushings may be quickly salvaged.

(4) The bushings may be made up as wanted, thereby eliminating the necessity of carrying a large stock and the tying up of considerable lead in such stock, which stock would be required if the battery manufacturer had to send such bushings to the moulder of the cover to be put in as inserts or if the cover manufacturer had to mould them himself.

(5) By making the bushings as desired, the surfaces are kept clean, facilitating the operation of autogenously joining the post to the bushing.

While I have referred to the covers as preferably being originally produced in an undercured condition for the reason given, I do not wish to be limited in this respect as an acid-tight joint can be obtained by my construction without resorting to the undercured cover.

Having thus described my invention, what I claim is:

In a lead-sulphuric acid battery, the method of obtaining an acid-tight seal around a battery post where it comes through the cover, which consists in forming an undercured cover of rubberlike insulating material with a threaded hole therein, also forming a hollow threaded bushing of suitable metal with a flange, screwing the bushing into the cover hole from the top until the flange engages the outer surface of the cover, then placing the cover in position over the battery plates so the post passes through said bushing, then autogenously joining the end of the post with the bushing and to other added metal as desired utilizing the flange for assisting in adding said other metal, the action of the sulphuric acid acting on the threads of the cover to cure them, whereby the bushing is securely gripped.

HAROLD D. STANLEY.